R. G. BRINDLE.
TESTING DEVICE.
APPLICATION FILED APR. 8, 1912.
1,178,902.
Patented Apr. 11, 1916.
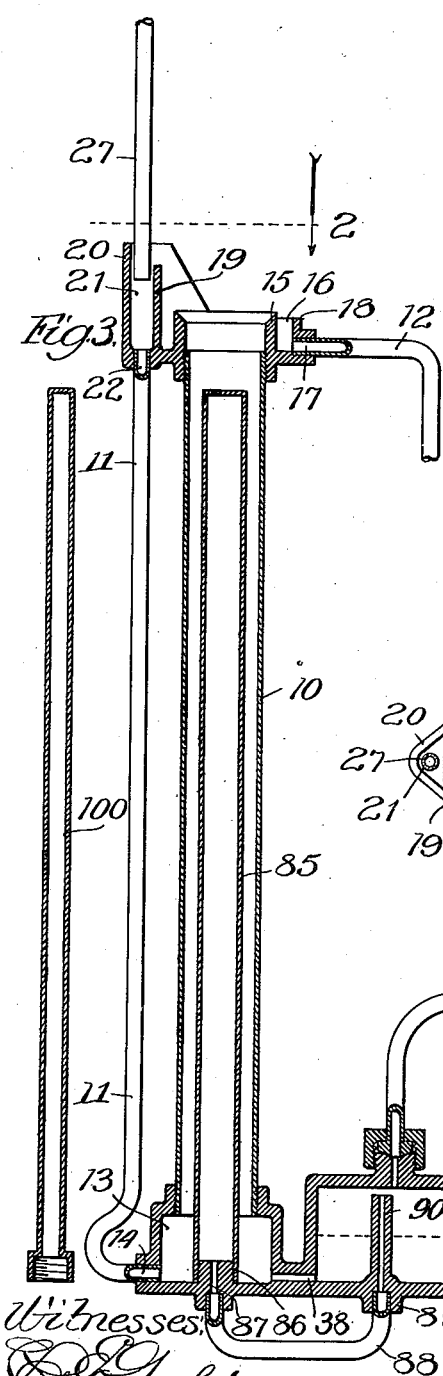
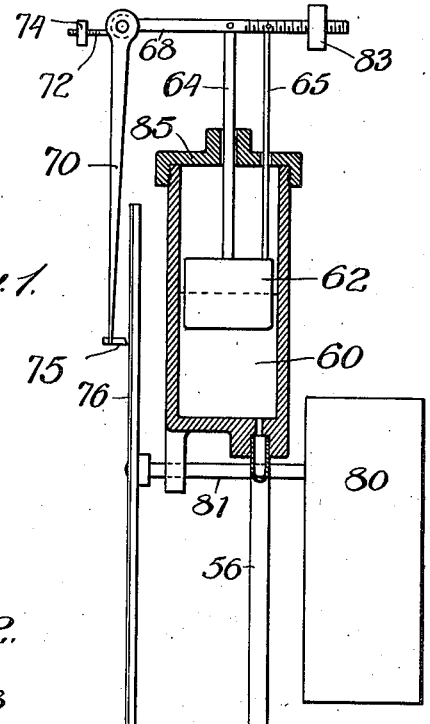
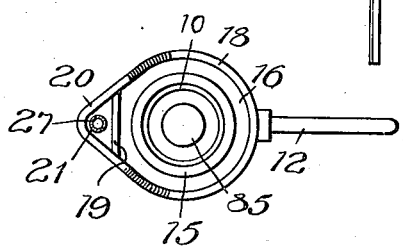
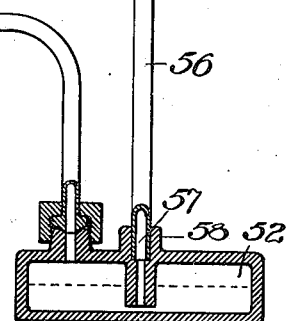
Witnesses
Carl S. Gaylord,
G. J. Chase.
Inventor.
Richard G. Brindle,
By Hirschl & Hirschl
Attys.

UNITED STATES PATENT OFFICE.

RICHARD G. BRINDLE, OF WAUKEGAN, ILLINOIS, ASSIGNOR OF ONE-HALF TO WADE W. REECE, OF CHICAGO, ILLINOIS.

TESTING DEVICE.

1,178,902.          Specification of Letters Patent.       Patented Apr. 11, 1916.

Application filed April 8, 1912. Serial No. 689,201.

*To all whom it may concern:*

Be it known that I, RICHARD G. BRINDLE, a citizen of the United States, residing at 121 Third street, Waukegan, Illinois, have invented new and useful Improvements in Testing Devices, of which the following is a specification.

This invention relates to measuring or testing devices for determining the specific gravity, or density of liquids, and more especially to a device for continuously measuring, indicating, and recording the specific gravity of a liquid which is flowing through the device, in order to determine the specific gravity of such liquid at all times, although its density may be changing, either continuously or periodically; as for example in the case of a liquid flowing through a pipe but undergoing changes in its specific gravity, a portion of which liquid is diverted through the measuring device and continuously tested to show the variations in the specific gravity of the liquid from which the part is diverted, or the sample taken.

The device comprises, in general, a tube containing a sample of the liquid in question, such tube being continuously supplied by fresh liquid flowing in at the bottom and over-flowing at the top; and means for measuring and recording the weight of the column of liquid in the tube. Such column being always of a pre-determined height, the specific gravity of the liquid composing it may be calculated from its weight; and the changes in specific gravity may be indicated and recorded from the variations in such weight.

A device embodying the principles of the present invention is illustrated in the accompanying drawings in which:

Figure 1 is a view in sectional elevation of the complete device. Fig. 2 is a horizontal section on the line 2 of Fig. 1. Fig. 3 is a similar view showing an air tube constituting part of the device, but of different proportions from that shown in Fig. 1.

As shown in said drawings, in Figs. 1 and 2, 10 indicates a vertical tube or stand pipe adapted to contain a column of the liquid to be tested, the latter being supplied through a supply pipe 11 to the foot of the column, and thence rising in the tube and over-flowing from its open upper end and escaping through a tube 12. Preferably the tube 10 is threaded at its lower end and screwed into a circular opening in the top of a cylindric chamber 13, through the wall of which is made an opening 14 communicating with the supply pipe 11. The upper end of the tube 10 is also threaded and screwed into a cylindric cap or ring 15, the latter being formed with an annular groove or trough 16 in its upper surface to receive the over-flow from the tube 10, and the over-flow tube 12 joining such groove 16 through a lateral opening 17 in its outer wall. At one side of the cylinder 15 the outer wall 18 of the annular groove 16 is made considerably higher, as shown at 19, and at the same place the cylinder is enlarged beyond the circumference of such outer wall 18 and formed with a still higher, curved, outside wall 20, in order to provide a chamber 21 into which the liquid is supplied, such chamber being connected to the tube 11 and supplying the latter by means of an opening 22 through its bottom. Liquid flowing from the source of supply is received into the chamber 21 through a vertical tube 27, which extends a short distance into such chamber, but is of such diameter as to leave a space around the lower end of the tube 27, between it and the walls of said chamber, whereby any excess of liquid beyond the amount which escapes through the opening 22 and flows downward through the tube 11 may flow over the wall 19 separating the chamber 21 and the annular groove or trough 16, and into the latter; whence it also escapes through the outlet tube 12. The effect of the foregoing arrangement of parts is that the liquid supplied through the tube 27 will flow at a substantially uniform rate of flow through the tube 11, its flow therethrough being governed entirely by the head of liquid below the upper edge of the wall 19, higher than which point the liquid cannot rise in the device.

The chamber 13 communicates through an opening 38 with a second and somewhat larger chamber 40, whereby the liquid is free to flow from the chamber 13 into the chamber 40 and rise therein to a height determined by the head of liquid in the tube 10 and the balancing pressure of air entrapped in the upper part of the chamber 40 above such liquid, as indicated by the dotted line marking the height of such liquid. It has been seen however, that as the tube 10 is always kept full of liquid the height of such column of liquid remains constant; and since the rate of flow of liquid through the tube 11, and of supply to the bottom of the tube 10 and over-flow from its top is likewise kept substantially constant, the weight or head of such column and the pressure thereby communicated by it to the liquid in the chamber 40, and to the air which is entrapped above such liquid, is proportional only to the specific gravity of the liquid in the column; and by measuring and determining the variations in the pressure of the air in the chamber 40 the corresponding specific gravity and changes of specific gravity of the liquid in the column in the tube 10 may be determined and recorded For measuring and recording the pressure of the air entrapped in the upper part of the chamber 40 above the liquid therein such chamber communicates through an opening in its top and a tube 50 connected therewith with the upper part of a chamber 52 likewise partly filled with liquid, as indicated by the dotted line marking the height of such liquid. Communicating with its interior is a liquid-containing tube 56 which is joined into an opening 57 through a cylindric boss 58 in the center of the cover of such chamber; such boss being extended downward nearly to the bottom of the chamber, and the opening 57 through its center being continued entirely therethrough, constituting in effect a downward extension of the tube 56 below the level of the liquid in the chamber in order that the pressure of the air entrapped above such liquid will force a portion thereof upward through the tube 56, and into a cylinder 60. As the liquid in the chambers 52 and 60 and in the tube 56 is not a part of that being tested, but is a part of the apparatus, it should be chosen with regard to its permanency of composition, viscosity, and other properties. Thus, for example, water, alcohol, oil or other liquids might be used according to the particular requirements of each case. It is evident also that since the pressure of the air entrapped in the upper part of the chamber 40 is the same as that in the chamber 52, by reason of the communicating pipe 50, the height of liquid in the tube 56 and chamber 60 will be governed entirely by such pressure irrespective of the relative locations of the tubes 56 and 10; or whether the former is higher or lower than the latter. Thus the tube 10 with its associated parts might be located in one part of a plant and the tube 56 with its associated parts might be placed at a distance therefrom and at a higher or lower level as might be found convenient; this fact being indicated in the drawing by showing the pipe 50 interrupted, to suggest that it does not necessarily continue in a straight line from one chamber to the other.

Within the cylinder 60 is placed a float 62 whose height in such cylinder will indicate the depth of liquid therein, and for conveniently determining and recording the latter, such float is joined by means of a pair of vertical rods 64 and 65 with a horizontal arm 68 carrying a depending pointer 70 at its end. The latter is hinged to the end of the arm 68 and is provided at its hub portion with an integral horizontal arm 72 upon which is placed an adjustable counter-weight 74, by means of which the lower end of the pointer, carrying a stylus 75, is made to bear against a circular disk 76 upon which its movements are recorded. A clock mechanism, indicated diagrammatically merely by the numeral 80, is made to rotate the disk 76 through a horizontal shaft 81, the particular features of construction of such clock mechanism constituting no part of the present invention. Upon the opposite end of the horizontal arm 68 is placed a similarly adjustable counter-weight 83 to balance the weight of the other parts and remove unnecessary side thrust between the rods 64 and 65 and the circular cylinder head 85 through which they pass.

By the foregoing it has been shown how the density or specific gravity of a column of liquid within the tube 10 may be measured and indicated, but since the specific gravity of a liquid varies with changes in its temperature it is necessary to provide temperature compensating means if it is desired to determine from a reading of the indicating devices what would be the specific gravity of the liquid at a different temperature from its actual temperature; as for example, where the liquids flowing through the apparatus vary in temperature and it is desired in all cases to determine what their densities would be at a given temperature. For this purpose there is placed within the tube 10 a smaller tube 85, closed at its upper end and threaded at its lower end to engage with a cylindric boss 86 provided upon the bottom of the chamber 13. An opening 87 through such boss communicates by means of a tube 88, with the interior of the chamber 40; the tube 88 being connected to a similar boss 89 in the bottom of the chamber 40, which boss is extended upward in the form of a tube 90 to a point above the level of the liquid in such chamber. It will be seen therefore that the liquid in the tube 10 surrounds the tube 85 and imparts its temperature thereto, and the latter in turn, by conduction and radiation, imparts the temperature of the liquid column to the air in its interior; whereby the lessened density of a liquid at higher temperature is compensated by the expansion of the air in the tube 85, and vice versa, in order to show at all times a reading upon the dial 76 compensated for temperature changes and reduced to a common temperature.

Since the rate of expansion and contraction with changes in temperature is different for different liquids it is necessary to provide means for adapting the compensating parts of the instrument to different liquids. For this purpose one or more air tubes 100, Fig. 3, may be provided, of different volume from the tube 85, to be used instead of the latter to provide a correspondingly different degree of compensation. The tube 100 is in all respects similar to the tube 85 except that it is smaller in diameter and consequently of smaller capacity, and its lower end is shown enlarged and threaded similarly to the lower end of the tube 85 in order to engage with the cylindric boss 86 as above described.

In operation the instrument is first adapted to the scales to be used by selecting an air tube 85 or 100, of the required volumetric capacity and placing it within the tube 10 in the position shown. The liquid to be tested is then introduced into the apparatus through the tube 27 at such rate of flow as to cause an over-flow over the wall 19. A part of the liquid will then flow continuously through the tube 11 and supply the tube 10, over-flowing at the top of the latter into the over-flow tube 12. The air entrapped above the liquid in the chamber 40 will be compressed by the weight of the balancing column in the tube 10 and the pressure of the air in the compensating tube 85; and such pressure will be communicated through the tube 50, the chamber 52, the tube 56 and the float 62 to the indicating devices as above described; and a continuous record of the movement of such devices will be kept on the rotating dial 76.

I claim as my invention:

1. In a specific gravity testing device, a stationary vertical tube containing a column of liquid of constant height, means for variably supporting the pressure of the column of liquid in the tube, and means for indicating the pressure of such column on such supporting means.

2. In a specific gravity testing device, a stationary vertical tube containing a column of liquid, means for maintaining such column at a constant height, means for variably supporting the pressure of the column of liquid in the tube, and means for indicating the pressure of such column on such supporting means.

3. In a testing device, a tube containing a column of liquid of constant height, an air chamber communicating with such tube, and receiving liquid therefrom, and means for determining variations in the pressure of air in such chamber entrapped above the liquid therein.

4. In a specific gravity testing device, a stationary tube containing a column of liquid of constant height, means for indicating variations in the weight of such liquid, such means including an air chamber, and means communicating with such air chamber for compensating such indications for variations in the temperature of such liquid.

5. In a testing device, a tube containing a column of liquid of constant height, means for indicating variations in the weight of such liquid, and means for compensating such indications for the temperature of such liquid, such last mentioned means comprising an air tube within such column communicating with such first recited means.

6. In a testing device, a vertical tube containing the liquid to be tested, a chamber communicating therewith to receive a part of such liquid, an air tube within such first mentioned tube communicating with the upper part of such chamber, and means for indicating variations in the pressure of air in such chamber entrapped above the liquid therein.

7. In a testing device, a vertical tube containing the liquid to be tested, a chamber communicating therewith to receive a part of said liquid, an air tube within such first mentioned tube, communicating means between such air tube and the upper part of such chamber, and means for indicating variations in the pressure of air in such chamber entrapped above the liquid therein, such last mentioned means comprising a second chamber with liquid therein, a tube supplied with liquid therefrom, and a float in such liquid.

8. In a testing device, a tube containing a column of the liquid to be tested, an air chamber, means for balancing the weight of such column by the pressure of air in such air chamber, and means for indicating variations in the pressure of such air, such last mentioned means comprising a tube containing other liquid, a second air chamber communicating therewith and with such first mentioned air chamber for balancing the weight of such other liquid by the pressure of air in such second air chamber, and means for indicating variations in the height of such other liquid.

9. In a testing device, a tube containing a column of the liquid to be tested, an air chamber, means for balancing the weight of such column by the pressure of air in such air chamber, and means for indicating variations in the pressure of such air, such last mentioned means comprising a tube containing other liquid, a second air chamber communicating therewith and with such first mentioned air chamber for balancing the weight of such other liquid by the pressure of air in such second air chamber, and a float in such other liquid for indicating variations in the height thereof.

10. In a testing device, a tube containing a column of the liquid to be tested, an air chamber, means for balancing the weight of such column by the pressure of air in such air chamber, and means for indicating variations in the pressure of such air, such last mentioned means comprising a tube containing other liquid, a second air chamber communicating therewith and with such first mentioned air chamber for balancing the weight of such other liquid by the pressure of air in such second air chamber, a float in such other liquid for indicating variations in the height thereof, a pointer carried by such float, and means for recording the movements of such pointer.

11. In a testing device, a stationary vertical tube, means for continuously supplying liquid thereto, and means for continuously indicating and recording variations in the weight of the liquid in such tube.

12. In a testing device, a tube containing a column of the liquid to be tested, an air tube within such column, means for indicating variations in the density of such liquid, and means for transmitting the pressure of the air in such air tube to the indicating parts of the device to compensate for changes in the temperature of such liquid.

13. In a device for testing specific gravities and compensating for varying temperatures, the combination of a tube adapted to contain the liquid to be tested, interchangeable air tubes of varying volumetric capacities, each adapted for arrangement within such liquid-containing tube, and means for transmitting the pressure of air in an air tube so arranged within such liquid-containing tube to other parts of the device.

In witness whereof, I have hereunto subscribed my name in the presence of two witnesses this 5th day of April, 1912.

RICHARD G. BRINDLE.

Witnesses:
ARTHUR S. UTITZ,
LILLIAN CHRISTIANSON.